Patented June 25, 1946

2,402,615

UNITED STATES PATENT OFFICE 2,402,615

CATALYTIC PROCESS AND PRODUCTS THEREOF

Mark W. Farlow and Frank K. Signaigo, Wilmington, Del., assignors to E. I. du Pont de Nemours & Company, Wilmington, Del., a corporation of Delaware No Drawing. Application September 19, 1940 Serial No. 357,419

15 Claims. (Cl. 260—609)

This invention relates to thiols and a process for their preparation.

This application is a continuation-in-part of copending application Serial No. 289,580, filed August 11, 1939.

Within recent years organic sulfur compounds have become of considerable importance as industrial chemicals, particularly in the fields of insecticides, surface-active agents, rubber chemicals, and pharmaceuticals. As a starting point for the preparation of many such compounds, the thiols are of prime importance. These may be oxidized to disulfides and sulfinic and sulfonic acids. They may be reacted also with organic halogen compounds to form thio ethers which on oxidation are converted to sulfoxides and sulfones. Another class of sulfur compounds derived from thiols are the thioacetals and thioketals. This invention has as its object a process for the production of thiols. Another object is an economical process for the production of thiols adaptable to large-scale operation. Other objects will be apparent from the following description of the invention.

These objects are accomplished by the following invention which comprises catalytically hydrogenating an organic compound having a thioaldehyde group or a sulfhydrate or polymer thereof. Alternatively, an organic compound containing an aldehyde group or a group that is hydrolyzable to an aldehyde group is catalytically hydrogenated in the presence of hydrogen sulfide.

In practicing this invention it is usually more convenient to combine into a single operation the formation and hydrogenation of the thioaldehyde. To accomplish this, an aldehyde is charged into a hydrogenation autoclave together with sulfur as a source of hydrogen sulfide and a sulfactive hydrogenation catalyst. The autoclave is then charged with hydrogen at superatmospheric pressure and agitated and heated to a temperature at which reaction proceeds at a suitable rate, usually in the neighborhood of 150° C. After the reaction is complete as evidenced by the cessation of hydrogen absorption, the autoclave is cooled and the product is filtered from the catalyst. The thiol may then be isolated or purified, usually by distillation. The following examples show in greater detail the practice of this invention in several of its modifications. The amounts of materials referred to are parts by weight.

Example I

A sulfactive hydrogenation catalyst is prepared as follows: A solution of 240 parts of sodium sulfide nonahydrate and 64 parts of sulfur in 1500 parts of water is added with stirring to a solution of 238 parts of cobalt chloride hexahydrate in 1700 parts of water. The black precipitate is filtered with suction and washed substantially free from soluble salts with water. Since the dry catalyst oxidizes spontaneously in air with resulting loss in catalytic activity it is protected from air by being stored and used in a liquid medium. Suitable liquids are water, alcohols, ethers, hydrocarbons and organic acids. The presence of acids during the hydrogenation process frequently leads to more rapid conversion of carbonyl compounds to thiols so that it is convenient to wash the catalyst with an acid such as acetic acid and to use the catalyst in the form of a paste with acetic acid. This catalyst is used to convert an aldehyde to a thiol as follows:

One hundred parts of commercial heptaldehyde, 60 parts of sulfur, and 55 parts of the acetic acid-cobalt polysulfide catalyst paste containing 10 parts of cobalt polysulfide are charged into a hydrogenation autoclave. The autoclave is then filled with hydrogen to an initial pressure of 1200 lbs./sq. in. and agitated and heated to 150° C. At this temperature reaction is rapid, as evidenced by the rapid decrease in pressure, and additional hydrogen is added from time to time to replace that absorbed and to maintain the pressure within the range from 1200 to 2800 lbs./sq. in. After one hour at reaction temperature, the reaction becomes slower and the temperature is raised to 175° C. for an additional hour. The product is rinsed from the cooled autoclave with ether and filtered to separate the catalyst. The filtrate is then washed with water to remove the acetic acid, dried over anhydrous sodium sulfate and distilled. After removal of the ether and an intermediate cut, 77 parts of heptanethiol-1 distills over at 90° to 93° C. at 49 mm. pressure. Fifteen parts of higher boiling material remains in the distillation pot. The distilled thiol has a refractive index of $n_d^{25}=1.4488$ and density of $d_4^{25}=0.8399$. It contains 23.8% of thiol sulfur, which corresponds to a purity of 98% as heptanethiol-1. The conversion of heptaldehyde to heptanethiol may be formulated as follows:

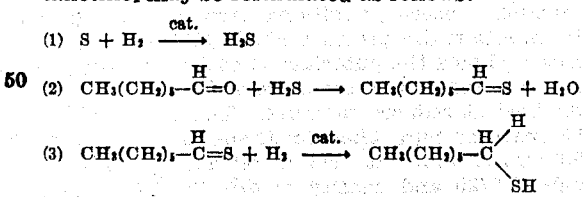

Example II

A nickel sulfide hydrogenation catalyst is prepared as described in Example I for the cobalt sulfide catalyst except that an equivalent amount of nickel chloride hexahydrate is substituted for the cobalt chloride hexahydrate. Seventy parts of distilled heptaldehyde, 36 parts of sulfur, 75 parts of dioxane solvent and 17 parts of the acetic acid catalyst paste containing 7 parts of nickel polysulfide catalyst are charged into a hydrogenation autoclave together with hydrogen at an initial pressure of 1000 lb./sq. in. The autoclave is agitated and heated at 175° C. for 3 hours, during which time additional hydrogen is added, the total pressure being maintained within the range from 800 to 1600 lbs./sq. in. The contents of the autoclave are rinsed out with dioxane and filtered to separate the catalyst. The solution is then blown with nitrogen to remove the unreacted hydrogen sulfide. Titration of an aliquot of the product with standard iodine solution indicates the yield of heptanethiol-1 to be 77% of the theoretical. The pure heptanethiol-1 is separated from the solvents and small amount of by-products by distillation.

*Example III*

One hundred parts of 2-ethylhexanal-1, 60 parts of sulfur, 50 parts of acetic acid, and 15 parts of cobalt sulfide catalyst are charged into a hydrogenation autoclave. The cobalt sulfide catalyst is prepared by bubbling hydrogen sulfide through a methanol suspension of finely divided pyrophoric cobalt metal at room temperature until no further sulfidation occurs. The autoclave is charged with hydrogen to a pressure of 1000 lbs./sq. in. and agitated and heated to a temperature of 150° C. Additional hydrogen is added occasionally to replace that absorbed. After 3 hours the initial rapid reaction has subsided, and the temperature is raised to 175° C. and maintained there for an additional 3 hours to insure completion of the reaction. The autoclave is cooled, and the contents rinsed out with ether and the solution filtered to separate the catalyst. The crude product is then fractionated from the solvents and there is obtained 96 parts of pure 2-ethylhexanethiol-1 and 11 parts of high-boiling residue. The thiol boils at 77° C./17 mm., has a refractive index of $n_d^{25}=1.4541$ and density of $d_4^{25}=0.8467$. It contains 21.5% of thiol sulfur. Calculated for $C_8H_{17}SH$: 21.9%. The yield is 84% of the theoretical.

*Example IV*

One hundred parts of commercial benzaldehyde, 60 parts of sulfur and 5 parts of finely divided activated iron are charged into a hydrogenation autoclave. The iron is prepared by extracting the aluminum with hot caustic solution from a powdered alloy of equal weights of iron and aluminum. The autoclave is charged with hydrogen to an initial pressure of 1000 lbs./sq. in. and agitated and heated to 150° C. During the period of heating the autoclave to reaction temperature the pyrophoric iron reacts with the sulfur to form an active iron sulfide catalyst. As reaction proceeds, additional hydrogen is added to maintain the pressure above 1000 lbs./sq. in. After 4 hours the autoclave is cooled and the reaction mixture is filtered from the catalyst and distilled at reduced pressure. There is obtained 93 parts of pure phenylmethanethiol boiling at 99° C./33 mm. It has a refractive index of $n_d^{25}=1.5729$ and density of $d_4^{25}=0.8097$. There is also obtained 12 parts of high-boiling distillation residue. The yield of thiol is 80% of the theoretical. The formation of the catalyst and the conversion of benzaldehyde may be formulated as follows:

(1) $Fe + S \rightarrow FeS$

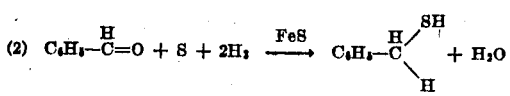

The process of this invention is also applicable to the preparation of thiols from aldehydes containing other functional groups. This is shown by the following experiments.

*Example V*

One hundred parts of commercial 2-ethylhexenal-1, 60 parts of sulfur, and 50 parts of cobalt sulfide-acetic acid catalyst paste containing 15 parts of cobalt polysulfide are charged into an autoclave, together with hydrogen at an initial pressure of 1000 lbs./sq. in. The autoclave is agitated and heated to a temperature of 150° to 175° C. for 5 hours and the pressure is maintained within the range of 1000 to 2000 pounds by the addition of more hydrogen as needed. The contents of the cooled autoclave are then rinsed out with ether and filtered to separate the catalyst and vacuum distilled. In addition to a foreshot of solvents the following fractions are obtained:

| Fraction | B. P. at 32 mm. | Amount | Thiol sulfur content |
|---|---|---|---|
| | | *Parts* | *Percent* |
| 1 | 65–84° C | 6.5 | |
| 2 | 85–94° C | 29.4 | 16.4 |
| 3 | 100–131° C | 7.7 | |
| 4 | 131–132° C | 29.8 | 30.6 |
| 5 | Residue | 8.0 | |

Fraction 2 is 2-ethylhexenethiol-1 contaminated with unconverted starting material. Fraction 1 is principally 2-ethylhexanedithiol-1,3 or possibly -1,2. By refractionation nearly pure 2-ethylhexanedithiol is obtained. It boils at 131° C. at 27 mm., has a refractive index of $n_d^{25}=1.5042$ and contains 35.5% sulfur. Calculated for $C_8H_{18}S_2$: $S=36.0\%$. The formation of these thiols may be illustrated by the following equations:

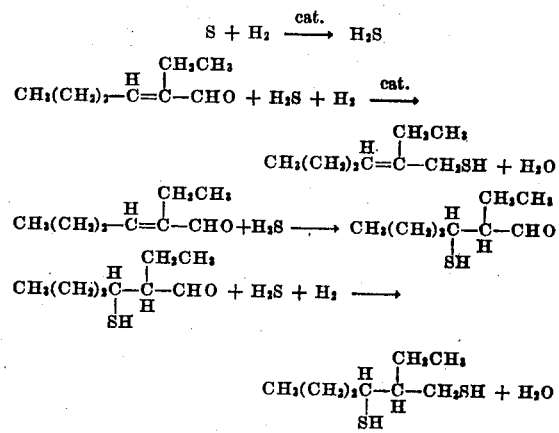

*Example VI*

Forty parts of 5-carbomethoxyvaleric aldehyde, 20 parts of sulfur, and 5 parts of cobalt polysulfide catalyst prepared as described in Example I and pasted with methanol are charged into an autoclave together with 60 parts of methanol solvent. The autoclave is filled with hydrogen to an initial pressure of 800 lbs. per sq. in. and heated during 45 minutes to 160° C. The reaction commences at about 100° C. as evidenced by the decrease in pressure and becomes very rapid at 160° C. After 2.5 hours heating, no further pressure drop is observed and the autoclave is cooled and the contents filtered to separate the catalyst and blown with nitrogen to remove the unreacted hydrogen sulfide. Titration of an aliquot of the product with standard iodine solution indicates the conversion to 5-carbomethoxypentanethiol-1 to be 48% of the theoretical. By distillation of the crude product there is obtained a liquid fraction boiling at 125° to 127° C. at 26 mm. Based on its thiol sulfur content of 10.8%, it is a mixture of unconverted starting material with about 55% of the 5-carbomethoxypentanethiol-1.

*Example VII*

Sixty-six parts of commercial aldol and 48 parts of sulfur are charged into an autoclave together with 66 parts of dioxane solvent and 6 parts of cobalt sulfide catalyst pasted with dioxane and prepared as described in Example I. Hydrogen is admitted to the autoclave to a pressure of 1200 lbs. per sq. in. and the autoclave is stirred and heated at 125° C. for 6 hours. During this period hydrogen is added to the autoclave, the pressure being maintained within the range from 1200 to 2000 lbs./sq. in. After filtering the reaction mixture from the catalyst and removing the excess hydrogen sulfide, titration of an aliquot of the product indicates the presence of 0.935 mol of thiol for each 100 grams of aldol charged. Vacuum distillation of the reaction mixture yields the following fractions:

| Fraction | B. P. | Pressure | Amount | Thiol sulfur content |
|---|---|---|---|---|
|  |  | Mm. | Parts |  |
| 1 | 28° C | 18 | 27 | 41.5%. |
| 2 | 81° C | 3 | 13 | 13.8% (total S=42.4). |
| 3 | Residue |  | 6 |  |

The analyses and boiling points indicate that fraction 1 is a mixture of approximately equal parts of 3-hydroxybutanethiol-1 and butanedithiol-1,3. Fraction 3 is apparently 3-hydroxybutyl 3-mercaptobutyl sulfide. The dithiol and the sulfide are formed probably by the addition of hydrogen sulfide and the hydroxybutanethiol, respectively, to crotonaldehyde, followed by conversion of the aldehyde group to a thiol group. The crotonaldehyde results from dehydration of some of the aldol.

*Example VIII*

Sixty-five parts of commercial dextrose and 30 parts of powdered sulfur are charged into a hydrogenation autoclave, together with 100 parts of water and 6 parts of cobalt sulfide catalyst in the form of an aqueous paste. Hydrogen is admitted to the autoclave to a pressure of 1300 lbs./sq. in. and the autoclave is agitated and heated to 125° C. At this temperature a rapid reaction ensues as evidenced by the decrease in pressure and more hydrogen is added from time to time to maintain the pressure within the range from 1300 to 1900 lbs./sq. in. After 2 hours hydrogen is absorbed more slowly and the heating is continued for an additional 2 hours to insure completion of the reaction. The autoclave is then cooled and the products rinsed out with water and filtered to separate the catalyst. The aqueous solution is then heated at 100° C. under a pressure of 10 to 15 mm. until substantially all of the water and water-insoluble by-products are removed. Fifty-three parts of crude 1-thiosorbitol (CH$_2$OH(CHOH)$_4$CH$_2$SH) is obtained as a sirupy residue. The crude product contains 12.2% of thiol sulfur which corresponds to a thiosorbitol content of 76%.

*Example IX*

The process of this invention is applicable also to the conversion of hydrolyzable derivatives of aldehydes to the corresponding thiols, as is illustrated by the following experiment. Fourteen parts of the solid addition product of lauric aldehyde and sodium bisulfite is charged into a hydrogenation autoclave together with 10 parts of sulfur and 2.5 parts of cobalt sulfide catalyst and 100 parts of water. The autoclave is heated at a temperature of 160° C. for 3 hours, after which time no further decrease in pressure is observed. The reaction mixture is filtered from the catalyst, acidified and extracted with ether. Evaporation of the ether leaves a residue of 7 parts of a colorless oil containing 5 parts of dodecanethiol-1.

The conversion of various aldehydes to the corresponding primary thiols has been illustrated in the foregoing examples. The process of this invention is applicable generally to other compounds having an aldehyde group. As examples of compounds that may be converted to thiols according to this invention, there may be mentioned saturated aliphatic aldehydes such as formaldehyde and its polymers (paraldehyde), acetaldehyde, propionaldehyde, n-butyraldehyde, isobutyraldehyde, n-valeric aldehyde, isovaleric aldehyde, hexaldehyde, caprylic aldehyde, lauric aldehyde; unsaturated aldehydes such as acrolein, methacrolein, tiglic aldehyde, crotonaldehyde, 2-ethyl-3-propyl acrolein, geranial, citronellal; aromatic aldehydes such as toluic aldehydes and cinnamic aldehyde. The aldehyde may contain also other functional groups in addition to the carbonyl group. Examples of such functional groups are the ethylenic bond, the acetylenic bond and hydroxyl, ether, amino, halogen, nitro, and carboxyl groups. Examples of compounds of this class are glycolic aldehyde, glyoxylic acid, chloral, glyceric aldehyde, diacetonaldehyde, furfural, alpha-pyrrolaldehyde, aldose sugars, chlorobenzaldehyde, salicylaldehyde, nitrobenzaldehyde, vanillin, veratric aldehyde, methoxybenzaldehyde, dihydroxybenzaldehyde and the like. Compounds containing more than one aldehyde group may also be processed according to this invention to yield di- and polythiol compounds. Examples of compounds of this class are glyoxal, adipic dialdehyde and phthalic aldehydes.

Certain aldehydes form hydrates which are considered to have the grouping

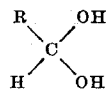

Such hydrates will behave as true aldehydes in the process of this invention, and their conversion to thiols is likewise a part of this invention. Generally, derivatives that are hydrolyzable to carbonyl compounds may also be converted to the corresponding thiols by this process. Examples of compounds of this class are the bisulfite addition compounds of aldehydes (see Example IX), the aldimines, aldehyde ammonias, hemiacetals (Example VIII) and the hydrazones, semi-carbazones, oximes, and anils of aldehydes.

The normal product obtained by the hydrogenation of an aldehyde in the presence of hydrogen sulfide according to the process of this invention is the corresponding thiol in which the mercapto group is attached to the carbon atom originally forming the carbonyl group. As explained in some of the foregoing examples, however, alpha, beta-unsaturated aldehydes react to form dithiols in addition to the unsaturated thiols. The second mercapto group in the dithiol is formed by addition of hydrogen sulfide to the double bond.

While not essential in most cases, solvents may be employed in carrying out the hydrogenation process. Examples of solvents that may be used are water and organic solvents such as hydrocarbons, alcohols, ethers, acids, and the like. In addition to simple solvents, the reaction may also be accomplished in the presence of such materials as acids, alkalis, ammonia, and amines. The use of acids in the reaction media frequently leads to more rapid conversion to thiols.

In the foregoing examples the use of sulfur as a source of hydrogen sulfide has been illustrated as this is an especially convenient way to generate the desired reagent. However, hydrogen sulfide itself may be charged into the autoclave together with the other reactants. Instead of hydrogen sulfide or sulfur, other sulfur compounds that are converted to hydrogen sulfide under the reaction conditions may be used. Examples of such materials are sulfur dioxide, ethyl tetrasulfide, carbon bisulfide, and alkali and ammonium sulfides. The proportion of hydrogen sulfide to carbonyl compound employed may be varied considerably. However, it is usually preferred to employ an excess of hydrogen sulfide or source of hydrogen sulfide over the amount theoretically required.

The process of this invention may be operated over a considerable range of temperatures and pressures. Reaction occurs in many cases at temperatures as low as 100° C., although usually at a low rate. As the temperature is raised, the rate of reaction increases, and it is therefore preferable to operate at temperatures above 100° C. The upper temperature limit at which the process may be operated is determined principally by the thermal stability of the compound processed. In most cases the compounds are stable at temperatures up to at least 200° C. and therefore it is suitable to operate at temperatures between 100° and 200° C. The reaction proceeds well even at low pressure of hydrogen, but in order to insure a practicable rate of reaction it is desirable to operate at a hydrogen pressure of at least 100 lbs./sq. in.

As sulfactive catalysts that may be used in carrying out the process of this invention, it has been found that certain metal sulfides are especially suitable for this purpose since these are not poisoned by sulfur and are at the same time highly active. Examples of these are sulfides of the hydrogenating metals such as chromium, cobalt, copper, iron, lead, molybdenum, nickel, palladium, tin, tungsten, and vanadium. It is preferred, however, to use sulfides of the metals cobalt, molybdenum, nickel, and iron, since these have been found to be especially active. Such catalysts may be prepared by a variety of methods, as, for example, by precipitating the metal sulfide from a solution of a metal salt with hydrogen sulfide, a solution of alkali or alkaline earth metal sulfide or polysulfide, or with ammonium sulfide or polysulfide. Another method that has been found to yield very active catalysts is to treat the finely divided pyrophoric or activated metal suspended in a liquid medium with hydrogen sulfide on sulfur until sulfidation is substantially complete. Other methods for obtaining metal sulfide catalysts include heating powdered metals or metal compounds such as the oxides, carbonates, or sulfides, with volatile sulfiding agents such as sulfur, hydrogen sulfide, or carbon bisulfide. The hydrogenating activity of metal sulfides may be increased frequently by treatment with hydrogen at elevated temperatures. The hydrogen treatment of the metal sulfide in many cases can be combined conveniently into a single operation with the hydrogenation reaction for which the catalyst is to be used.

By the term "sulfactive hydrogenation catalyst" as used herein and in the claims, we mean a catalyst prepared as described in U. S. Patents Nos. 2,221,804 and 2,230,390, and which is active for the catalytic hydrogenation of the sulfur in organic multisulfides, organic sulfur compounds having carbon to sulfur unsaturation, and organic sulfur compounds having sulfur to oxygen unsaturation.

Instead of charging the metal sulfide as such, it may be formed in situ by placing the finely divided pyrophoric or activated metal into the autoclave together with the other reactants. The sulfur or hydrogen sulfide present will convert the metal to the active metal sulfide in the early stages of the reaction process. The catalyst employed may be substantially a pure metal sulfide or a combination of metal sulfides. Other substances may be present also as, for example, kieselguhr, alumina, magnesia, carbon, and other supporting or promoting materials.

As mentioned above, it is especially convenient to form the thioaldehyde and hydrogenate it to the corresponding thiol in a single operation. However, it is within the scope of this invention to react an aldehyde with hydrogen sulfide by any suitable means and subsequently to hydrogenate the reaction product with a sulfactive hydrogenation catalyst to obtain the thiol. One method for forming thioaldehydes or their polymers is to dissolve the aldehyde in absolute alcohol and simultaneously to pass streams of anhydrous hydrogen chloride and hydrogen sulfide through the cooled solution until no more hydrogen sulfide is absorbed. Thereafter, the alcohol, hydrogen chloride, and excess hydrogen sulfide may be removed and the crude reaction product hydrogenated to the thiol in the presence of a sulfactive hydrogenation catalyst. Other means of forming thioaldehydes include reaction of an aldehyde with phosphorus pentasulfide and reaction of a 1,1 dihalide with an alkali hydrosulfide. The thioaldehydes in many cases react with hydrogen sulfide to form sulfhydrates—compounds having the grouping

In hydrogenating the preformed thioaldehyde or other reaction product of aldehydes with hydrogen sulfide to the corresponding thiol, the conditions employed are the same as those described for the combined formation and hydrogenation of the thioaldehyde except that the presence of hydrogen sulfide is not essential.

Thioaldehydes that may be hydrogenated according to this invention are those corresponding to each of the carbonyl compounds mentioned above and their sulfhydrates and polymers.

This invention constitutes a useful and economical process for preparing primary thiols. These products are useful as intermediates for the preparation of other organic sulfur compounds such as sulfides, sulfoxides, sulfones, sulfinic and sulfonic acids and thioacetals. The compounds are also useful as insecticides, dyestuff intermediates, and rubber chemicals.

As many apparently widely different embodiments of this invention may be made without departing from the spirit and scope thereof, it is to be understood that we do not limit ourselves to the specific embodiments thereof except as defined in the appended patent claims.

We claim:

1. The process for the preparation of thiols which comprises reacting an aldehyde with hydrogen and a substance selected from the group consisting of elementary sulfur, hydrogen sulfide and compounds capable of yielding hydrogen sulfide under the condition of reaction in the presence of a sulfactive hydrogenation catalyst, at a temperature in excess of 100° C.

2. The process for the preparation of thiols which comprises reacting an aliphatic aldehyde with hydrogen and a substance selected from the group consisting of elementary sulfur, hydrogen sulfide and compounds capable of yielding hydrogen sulfide under the conditions of reaction in the presence of a sulfactive hydrogenation catalyst, at a temperature in excess of 100° C.

3. The process in accordance with claim 2 characterized in that the aliphatic aldehyde is a saturated aliphatic aldehyde.

4. The process for the preparation of thiols which comprises reacting an unsaturated aldehyde with hydrogen and a substance selected from the group consisting of elementary sulfur, hydrogen sulfide and compounds capable of yielding hydrogen sulfide under the conditions of reaction in the presence of a sulfactive hydrogenation catalyst, at a temperature in excess of 100° C.

5. The process in accordance with claim 4 characterized in that the unsaturated aldehyde is an unsaturated aliphatic aldehyde.

6. The process for the preparation of thiols which comprises reacting an aromatic aldehyde with hydrogen and a substance selected from the group consisting of elementary sulfur, hydrogen sulfide and compounds capable of yielding hydrogen sulfide under the conditions of reaction in the presence of a sulfactive hydrogenation catalyst, at a temperature in excess of 100° C.

7. The process which comprises reacting an aldehyde with hydrogen and a substance selected from the group consisting of elementary sulfur, hydrogen sulfide and compounds capable of yielding hydrogen sulfide under the conditions of reaction in the presence of a metal sulfide hydrogenation catalyst, at a temperature in excess of 100° C.

8. The process in accordance with claim 7 characterized in that the metal sulfide catalyst is obtainable by treating a finely divided active metal with a sulfiding agent selected from the group consisting of sulfur, hydrogen sulfide and carbon bisulfide.

9. The process in accordance with claim 7 characterized in that the metal sulfide catalyst contains a metal polysulfide that has been treated at an elevated temperature with hydrogen.

10. The process in accordance with claim 7 characterized in that the metal sulfide catalyst contains metal polysulfides obtainable by precipitation of a soluble iron group metal salt with a substance selected from the group consisting of alkali sulfides and polysulfides, alkaline earth sulfides and polysulfides, and ammonium sulfide and polysulfide.

11. The process in accordance with claim 7 characterized in that the metal sulfide catalyst contains molybdenum sulfide.

12. The process in accordance with claim 7 characterized in that the metal sulfide catalyst contains sulfides of the metals of the iron group of the periodic table.

13. Process of claim 4 characterized in that the unsaturated aldehyde is an alpha, beta-unsaturated aldehyde.

14. The process of claim 7 characterized in that the metal sulfide catalyst is cobalt sulfide.

15. As a new composition of matter 2-ethylhexanedithiol-1,3.

MARK W. FARLOW.
FRANK K. SIGNAIGO.